July 3, 1956  G. H. COOK  2,752,821
WIDE ANGLE ANAMORPHOTIC ATTACHMENTS FOR OPTICAL OBJECTIVES
Filed Dec. 13, 1954
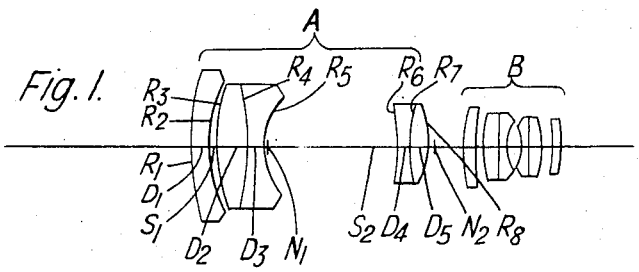
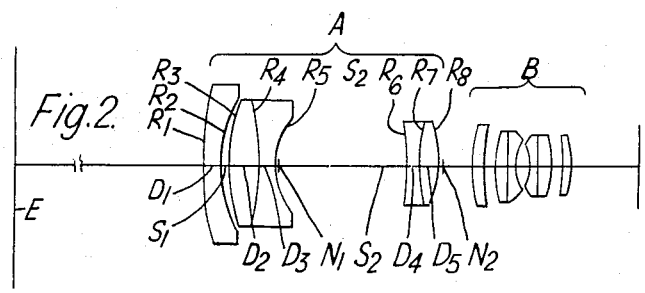
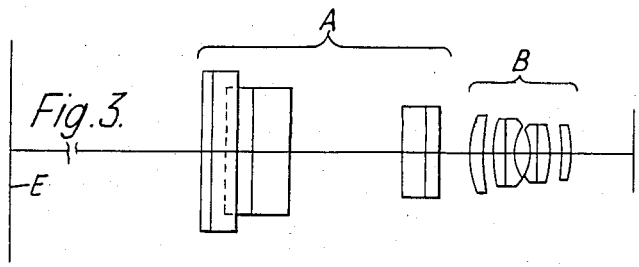
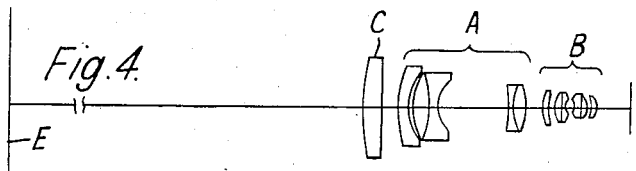
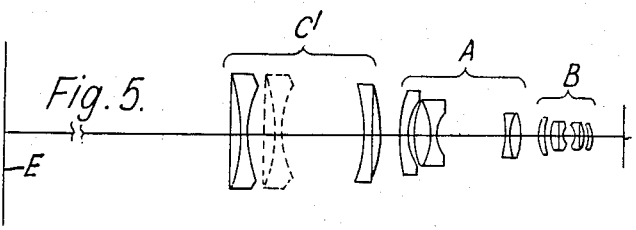
*Inventor*
GORDON H. COOK
*Attorneys*

United States Patent Office 2,752,821
Patented July 3, 1956

2,752,821
WIDE ANGLE ANAMORPHOTIC ATTACHMENTS FOR OPTICAL OBJECTIVES

Gordon Henry Cook, Leicester, England, assignor to Taylor, Taylor & Hobson Limited, Leicester, England, a British company Application December 13, 1954, Serial No. 474,919

Claims priority, application Great Britain February 5, 1954

15 Claims. (Cl. 88—57)

This invention relates to an attachment for an optical objective, primarily intended for giving a wide angular field. The attachment according to the invention may comprise elements having spherical surfaces, in which case it may be regarded as an improvement on conventional wide angle attachments, or alternatively elements having cylindrical surfaces, in which case it may be regarded as an improvement on the anamorphotic attachment forming the subject of the present applicant's co-pending United States of America patent application Serial No. 434,570, filed June 4, 1954.

The anamorphotic attachment of such copending application is primarily intended for use in front of an ordinary photographic or projection objective to enable a wide screen cinematographic reproduction system to be effectively and satisfactorily carried into practice. In such a reproduction system, one anamorphotic attachment is used in front of the photographic objective to effect lateral compression of a wide scene so that it can be photographed on to a normal film with a normal picture frame area having an aspect ratio of 4:3, and another anamorphotic attachment is used in front of the projection objective to broaden the picture back to its original proportions on a wide projection screen having a picture area with an aspect ratio of, say, 8:3.

The attachment for an optical objective, according to the present invention, is corrected for spherical and chromatic aberrations and coma, and comprises two members of which the rear member (nearer to the main objective) consists of a doublet and the front member of a doublet and a simple component in front thereof, the conditions in at least one axial plane being such that the rear member is convergent, whilst the front member is divergent and has its two components spaced apart by an axial distance less than .1 $f_1$, where $f_1$ is the positive valve of the equivalent focal length of the front member, each of such components being of meniscus form with its air-exposed surfaces convex to the front, the radius of curvature of the front surface of the simple component being greater than that of the front surface of the doublet and less than 4 $f_1$, whilst the radius of curvature of the rear surface of the doublet is less than that of the rear surface of the simple component and greater than .15 $f_1$, the radius of curvature of the rear surface of the simple component bearing to that of the front surface of the doublet a ratio lying between .55 and .85.

It should be made clear that the terms "front" and "rear" as applied herein to the attachment are used in the same senses as for the main objective, in front of which the attachment is located, the "front" being the side of the main objective nearer to the longer conjugate and the "rear" the side of the objective remote therefrom, so that in the case of a photographic objective the light passes through it from front to rear, whilst in the case of a projection objective the light passes through it from rear to front.

Preferably, each of the two doublets consists of a convergent element and a divergent element, the convergent element in the rear doublet being behind the associated divergent element, whilst in the doublet of the front member the convergent element is in front of the divergent element.

Conveniently, the radius of the rear surface of the doublet in the front member is less than .6 $f_1$, whilst the rear surface of the rear doublet is concave to the front and has radius of curvature between $\Delta$ and .4$\Delta$, where $\Delta$ is the difference between $f_1$ and $f_2$, $f_2$ being the equivalent focal length of the rear member.

In the rear member, the mean refractive index of the material of the divergent element preferably exceeds that of the convergent element by less than .22, the internal contact surface being convex to the front and having radius of curvature between .5 $f_2$ and 2 $f_2$.

In the doublet in the front member, the mean refractive index of the material of the convergent element preferably exceeds that of the divergent element by between .07 and .22, the internal contact surface being concave to the front and having radius of curvature between $f_1$ and 3 $f_1$.

In the case of an anamorphotic attachment, all the surfaces are cylindrical with parallel generatrices, the attachment being corrected for tangential curvature, and the foregoing conditions will apply in the axial plane at right angles to such generatrices. In this case, the separation between the adjacent nodal points of the two members may conveniently be substantially equal to $$\frac{D}{2(D+f_2)}[D+2f_2-\sqrt{D^2+4f_1D+4f_1f_2}]$$

where D is the distance of the longer conjugate plane (that is the object plane in the case of an attachment for a photographic objective or the projection screen plane in the case of an attachment for a projection objective) as measured from the front nodal point of the rear member. It will be noticed that this expression for the separation reduces to $\Delta$ in the case of an infinitely distant object.

With an anamorphotic attachment, however, it will usually be desirable to provide accommodation for different longer conjugate plane distances. In one such arrangement, the separation between the adjacent nodal points of the two members is fixed and substantially equal to $\Delta$, accommodation for different longer conjugate plane distances being afforded by providing in front of the attachment an additional lens whose focal length is approximately equal to the distance of the longer conjugate plane from the front nodal point of the additional lens. Such additional lens may have fixed focal length and may be removable to permit substitution of another additional lens of different focal length to suit a different longer conjugate plane distance, or alternatively the additional lens may be arranged to have variable focal length so that it can be adjusted to suit different longer conjugate plane distances. In an alternative arrangement, the separation between the adjacent nodal points of the two members is made variable to suit different longer conjugate plane distances.

As has been mentioned, however, the attachment may have all its surfaces spherical, and in such case the attachment is also corrected for astigmatism and field curvature. It is unnecessary in this case to provide an additional front lens or to make the separation between the two members variable, since different longer conjugate plane distances can satisfactorily be accommodated by the ordinary focussing adjustment of the main objective. In this case the separation between the adjacent nodal points of the two members is preferably substantially equal to $\Delta$.

Numerical data for a convenient practical example of attachment according to the invention, having either spherical or cylindrical surfaces, are given in the table below, and the accompanying drawings show some alternative uses for this example. In these drawings, Figure 1 shows the example having spherical surfaces, Figures 2 and 3 illustrate the same example with cylindrical surfaces, in two views at right angles, Figure 4 shows the system of Figures 2 and 3 with a front collimating lens for use with the longer conjugate plane at a fixed finite distance, and Figure 5 shows a modification of the arrangement of Figure 4 with an adjustable collimating lens to accommodate variations in the longer conjugate plane distance.

In the following table of numerical data, $R_1, R_2 \ldots$ represent the radii of curvature (in the case of an anamorphotic attachment, in the plane transverse to the generatrices of the surfaces), the positive sign indicating that the surface is convex to the front and the negative sign that it is concave thereto, $D_1, D_2 \ldots$ represent the axial thicknesses of the individual elements, and $S_1, S_2$ represent the axial air separations between the components. The table also gives the mean refractive indices $n_d$ for the $d$-line of the spectrum, and also the Abbé V numbers of the materials of the individual elements.

The insertion of equals (=) signs in the radius columns of the table, in company with plus (+) and minus (—) signs which indicate whether the surface is convex or concave to the front, is for conformity with the usual Patent Office custom and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the table may have to be treated as negative for some calculations as is well understood in the art.

| Radius | Thickness or Air Separation | Refractive Index $n_d$ | Abbé V Number |
|---|---|---|---|
| $R_1=+5.8207$ | $D_1= .275$ | 1.60483 | 43.8 |
| $R_2=+1.9977$ | $S_1= .140$ | | |
| $R_3=+2.7971$ | $D_2= .586$ | 1.67330 | 32.1 |
| $R_4=-4.5983$ | $D_3= .221$ | 1.51507 | 56.4 |
| $R_5=+1.2103$ | $S_2=2.437$ | | |
| $R_6=-5.7810$ | $D_4= .200$ | 1.65348 | 33.5 |
| $R_7=+5.0968$ | $D_5= .370$ | 1.51507 | 56.4 |
| $R_8=-1.7569$ | | | |

These dimensions are given with respect to an equivalent focal length $f_1$ for the divergent front member of 3.0, that for the convergent rear member $f_2$ being 6.0, so that the value of $\Delta$ is 3.0, and the telescopic power $f_2/f_1$ of the attachment is 2.0. The rear nodal point $N_1$ of the front member is distant .061 behind the rear surface $R_5$ of such member, and the front nodal point $N_2$ of the rear member is distant .624 behind the front surface $R_6$ of such member.

This example is well corrected over a wide angular field for spherical and chromatic aberrations and coma, and in addition, when the attachment has spherical surfaces, for astigmatism and field curvature, or, when the attachment has cylindrical surfaces, for tangential field curvature. In particular, it is to be noted that the provision of two separate components in the front member makes it possible to include correction for higher order aberrations, especially for coma and oblique chromatic aberration, and also for astigmatism and field curvature or for tangential curvature. The fact, that the simple component is in front of the doublet in the front member, enables the bulk of the attachment to be kept to a minimum.

When spherical surfaces are used, as shown in Figure 1, the two members of the attachment A are in fixed relative positions, and the value of $S_2$ given in the table corresponds to the axial air separation of the members in such case. It will be noticed that, with this value of $S_2$, the separation of the adjacent nodal points $N_1$, $N_2$ of the two members is equal to $\Delta$ or $(f_2-f_1)$, for $$.624-.061+2.437=3.000$$

The attachment is therefore afocal, and accommodation for different object distances or screen distances can be catered for by the ordinary focussing mechanism of the main objective (shown at B), in front of which the attachment A is located.

In the case of an anamorphotic attachment, using cylindrical surfaces, however, the situation is different.

Where it is unnecessary to provide for any variation of object distance or screen distance, the two members can be fixed in the relative positions suited to such distance (as shown in Figures 2 and 3). The value of $S_2$ given in the table corresponds to focussing on an infinitely distant object, but for an object or screen E at a finite distance, the value of $S_2$ should be altered so that the separation of the adjacent nodal points $N_1$, $N_2$ of the two members becomes equal to $$\frac{D}{2(D+f_2)}[D+2f_2-\sqrt{D^2+4Df_1+4f_1f_2}]$$

where D is the distance of the object or screen from the front nodal point of the rear member.

Alternatively, focussing for an object or screen E at a fixed finite distance can be effected (as shown in Figure 4) by utilising the value of $S_2$ given in the table, so that the attachment is focussed for infinity, and placing in front of the attachment A a collimating lens C (having spherical surfaces), that is a lens so placed that the distance of the object or screen E from its front nodal point is equal to its equivalent focal length. Such collimating lens C may consist merely of a simple element.

Where, however, it is desired to accommodate alterations in object distance or screen distance, the anamorphotic attachment must be provided with means for adjustment. This may be effected by making the two members of the attachment A, shown in Figures 2 and 3, relatively movable in the axial direction, or by keeping the attachment A itself focussed for infinity and providing either a set of interchangeable front collimating lenses C, arranged as in Figure 4, suited to different object or screen distances, or as shown in Figure 5, a variable front collimating lens $C^1$ which can be appropriately adjusted. Such variable focus collimating lens $C^1$ may consist of two components, whose separation is adjustable.

If the anamorphotic attachment A is focussed for infinity, the main objective B behind it should also be focussed for infinity, whilst if the attachment A is focussed for a finite object or screen distance by appropriate choice of the separation between its members, the main objective B must likewise be focussed on the object or screen. If, however, accommodation for a finite object or screen distance is afforded by the use of a front collimating lens C and $C^1$, whether fixed or variable, the main objective B must be focussed for infinity.

It is to be noted that, since the attachment (whether having spherical or cylindrical surfaces) is afocal, it is unimportant, as far as the axial beam is concerned, how far in front of the main objective it is placed, but in order to reduce oblique aberrations to a minimum and to ensure a wide angle of view without vignetting, it is preferable to dispose the attachment as close as possible to the front of the main objective.

What I claim as my invention and desire to secure by Letters Patent is:

1. An attachment for an optical objective, corrected for spherical and chromatic aberrations and coma, and comprising two members of which the rear member (nearer to the main objective) consists of a doublet and the front member of a doublet and a simple component in front thereof, the conditions in at least one axial plane being such that the rear member is convergent, whilst the front member is divergent and has its two components spaced apart by an axial distance less than .1 $f_1$, where $f_1$ is the positive value of the equivalent focal length of the front member, each of such components being of meniscus form with its air-exposed surfaces convex to the front, the radius of curvature of the front surface of the simple component being greater than that of the front surface of the doublet and less than 4 $f_1$, whilst the radius of curvature of the rear surface of the doublet is less than that of the rear surface of the simple component and greater than .15 $f_1$, the radius of curvature of the rear surface of the simple component bearing to that of the front surface of the doublet a ratio lying between .55 and .85.

2. An attachment for an optical objective as claimed in claim 1, in which the radius of curvature of the rear surface of the doublet of the front member is less than .6 $f_1$, whilst the rear surface of the rear doublet is concave to the front and has radius of curvature between $\Delta$ and .4$\Delta$, where $\Delta$ is the difference between $f_1$ and $f_2$, $f_2$ being the equivalent focal length of the rear member.

3. An attachment for an optical objective as claimed in claim 2, in which each of the two doublets consists of a convergent element and a divergent element, the convergent element in the rear doublet being behind the associated divergent element, whilst in the doublet of the front member the convergent element is in front of the divergent element.

4. An attachment for an optical objective as claimed in claim 3, in which in the rear member the mean refractive index of the material of the divergent element exceeds that of the convergent element by less than .22, the internal contact surface being convex to the front and having radius of curvature between .5 $f_2$ and 2 $f_2$ whilst in the doublet of the front member the mean refractive index of the material of the convergent element exceeds that of the divergent element by between .07 and .22, the internal contact surface being concave to the front and having radius of curvature between $f_1$ and 3 $f_1$.

5. An attachment for an optical objective as claimed in claim 1, in which each of the two doublets consists of a convergent element and a divergent element, the convergent element in the rear doublet being behind the associated divergent element, whilst in the doublet of the front member the convergent element is in front of the divergent element.

6. An attachment for an optical objective as claimed in claim 5, in which in the rear member the mean refractive index of the material of the divergent element exceeds that of the convergent element by less than .22, the internal contact surface being convex to the front and having radius of curvature between .5 $f_2$ and 2 $f_2$, where $f_2$ is the equivalent focal length of the rear member.

7. An attachment for an optical objective as claimed in claim 5, in which in the doublet of the front member the mean refractive index of the material of the convergent element exceeds that of the divergent element by between .07 and .22, the internal contact surface being concave to the front and having radius of curvature between $f_1$ and 3 $f_1$.

8. An anamorphotic attachment for an optical objective, having all its surfaces cylindrical with parallel generatrices and corrected for spherical and chromatic aberrations, coma and tangential curvature, and comprising two members of which the rear member (nearer to the main objective) is convergent and consists of a doublet, and the front member is divergent and consists of a doublet and a simple component in front thereof, the two components being spaced apart by an axial distance less than .1 $f_1$, where $f_1$ is the positive value of the equivalent focal length of the front member, each of such components being of meniscus form with its air-exposed surfaces convex to the front, the radius of curvature of the front surface of the simple component being greater than that of the front surface of the doublet and less than 4 $f_1$, whilst the radius of curvature of the rear surface of the doublet is less than that of the rear surface of the simple component and greater than .15 $f_1$, the radius of curvature of the rear surface of the simple component bearing to that of the front surface of the doublet a ratio lying between .55 and .85.

9. An anamorphotic attachment as claimed in claim 8, in which the radius of curvature of the rear surface of the doublet of the front member is less than .6 $f_1$, whilst the rear surface of the rear doublet is concave to the front and has radius of curvature between $\Delta$ and .4$\Delta$, where $\Delta$ is the difference between $f_1$ and $f_2$, $f_2$ being the equivalent focal length of the rear member.

10. An anamorphotic attachment as claimed in claim 8, in which each of the two doublets consists of a convergent element and a divergent element, the convergent element in the rear doublet being behind the associated divergent element, whilst in the doublet of the front member the convergent element is in front of the divergent element.

11. An anamorphotic attachment as claimed in claim 8, in which the separation between the adjacent nodal points of the two members is substantially equal to $$\frac{D}{2(D+f_2)}[D+2f_2-\sqrt{D^2+4f_1D+4f_1f_2}]$$

where D is the distance of the longer conjugate plane as measured from the front nodal point of the rear member and $f_2$ is the equivalent local length of the rear member.

12. An anamorphotic attachment as claimed in claim 8, for use when an additional lens is to be provided in front of the attachment for affording accommodation for different longer conjugate distances, in which the separation between the adjacent nodal points of the two members is fixed and substantially equal to the difference between $f_1$ and $f_2$ ($f_2$ being the equivalent focal length of the rear member).

13. An anamorphotic attachment as claimed in claim 12, in which the radius of curvature of the rear surface of the doublet of the front member is less than .6 $f_1$, whilst the rear surface of the rear doublet is concave to the front and has radius of curvature between $\Delta$ and .4$\Delta$, where $\Delta$ is the difference between $f_1$ and $f_2$, $f_2$ being the equivalent focal length of the rear member.

14. An anamorphotic attachment as claimed in claim 12, in which each of the two doublets consists of a convergent element and a divergent element, the convergent element in the rear doublet being behind the associated divergent element, whilst in the doublet of the front member the convergent element is in front of the divergent element.

15. An anamorphotic attachment as claimed in claim 8, in which the separation between the adjacent nodal points of the two members is variable to accommodate different longer conjugate plane distances.

References Cited in the file of this patent

UNITED STATES PATENTS

| Number | Name | Date |
|---|---|---|
| 756,799 | Dallmeyer | Apr. 5, 1904 |
| 1,932,082 | Newcomer | Oct. 24, 1933 |
| 1,934,561 | Rayton | Nov. 7, 1933 |
| 2,048,284 | Newcomer | July 21, 1936 |
| 2,184,018 | Ort | Dec. 19, 1939 |
| 2,317,790 | Mellor | Apr. 27, 1943 |
| 2,324,057 | Bennett | July 13, 1943 |
| 2,582,085 | Tolle | Jan. 8, 1952 |